(12) United States Patent
Tsai

(10) Patent No.: US 10,905,524 B2
(45) Date of Patent: Feb. 2, 2021

(54) METHOD AND SYSTEM FOR MANUFACTURING APICOECTOMY GUIDE PLATE AND COMPUTER-READABLE RECORDING MEDIUM

(71) Applicant: SKYCLEAR CO., LTD., Tainan (TW)

(72) Inventor: Yu-Wei Tsai, Tainan (TW)

(73) Assignee: Skyclear Co., Ltd., Tainan (TW)

( * ) Notice: Subject to any disclaimer, the term of this patent is extended or adjusted under 35 U.S.C. 154(b) by 476 days.

(21) Appl. No.: 15/858,895

(22) Filed: Dec. 29, 2017

(65) Prior Publication Data

US 2019/0083200 A1 Mar. 21, 2019

(30) Foreign Application Priority Data

Sep. 15, 2017 (TW) .............................. 106131761 A

(51) Int. Cl.
*G06F 30/17* (2020.01)
*A61C 5/44* (2017.01)
*A61C 13/00* (2006.01)
*A61C 19/04* (2006.01)
*A61C 5/40* (2017.01)
*A61C 1/08* (2006.01)
*A61C 9/00* (2006.01)

(52) U.S. Cl.
CPC .............. *A61C 5/44* (2017.02); *A61C 1/082* (2013.01); *A61C 5/40* (2017.02); *A61C 9/0046* (2013.01); *A61C 13/0004* (2013.01); *A61C 19/042* (2013.01); *G06F 30/17* (2020.01); *A61C 9/0053* (2013.01)

(58) Field of Classification Search
CPC .......... A61C 5/44; A61C 13/004; G06F 30/17

USPC ...... 703/1, 2, 6; 700/98; 433/72, 78; 604/20
See application file for complete search history.

(56) References Cited

U.S. PATENT DOCUMENTS 7,835,811 B2 * 11/2010 Schmitt .................. A61C 1/084
700/98
8,889,161 B2 * 11/2014 Latta ........................ A61K 8/24
424/401

(Continued)

OTHER PUBLICATIONS

Pinsky, Harold M., et al., "Periapical Surgery Using CAD/CAM Guidance: Preclinical Results," Basic Research—Technology, Feb. 2007, pp. 148-151, vol. 33, No. 2, USA.

*Primary Examiner* — Thai Q Phan
(74) *Attorney, Agent, or Firm* — Muncy, Geissler, Olds & Lowe, P.C.

(57) ABSTRACT

A method for manufacturing an apicoectomy guide plate includes: a) performing scanning to obtain a tooth jaw image model, a soft tissue image model, an alveolar bone image model, a tooth crown image model, and a tooth root image model that is defined with at least one affected area; b) calculating position relations of the tooth jaw image model corresponding to the soft tissue image model and the alveolar bone image model to determine at least one osteotomy and apicoectomy procedure, and establishing a guide plate model corresponding to the tooth jaw image model and the osteotomy and apicoectomy procedure; and c) outputting the apicoectomy guide plate, which includes a connecting portion corresponding to the soft tissue image model and the tooth crown image model, and at least one positioning portion corresponding to the affected area and comprising at least one pre-drilled hole.

9 Claims, 8 Drawing Sheets

(56) References Cited

U.S. PATENT DOCUMENTS

| | | | | |
|---|---|---|---|---|
| 2008/0085489 | A1* | 4/2008 | Schmitt | G16H 50/50 |
| | | | | 433/75 |
| 2008/0108011 | A1* | 5/2008 | Nahlieli | A61B 1/00167 |
| | | | | 433/29 |
| 2008/0255498 | A1* | 10/2008 | Houle | A61C 17/0211 |
| | | | | 604/20 |
| 2011/0066267 | A1* | 3/2011 | Schmitt | G06F 19/00 |
| | | | | 700/98 |
| 2014/0322664 | A1* | 10/2014 | Van Lierde | G06T 19/20 |
| | | | | 433/72 |

* cited by examiner

METHOD AND SYSTEM FOR MANUFACTURING APICOECTOMY GUIDE PLATE AND COMPUTER-READABLE RECORDING MEDIUM

FIELD OF THE INVENTION

The present invention relates to a method and a system for manufacturing an apicoectomy guide plate and a computer-readable recording medium, particularly a method and a system for manufacturing a surgical guide plate for guiding and positioning a hand tool of a dentist, and a computer-readable recording medium.

BACKGROUND OF THE INVENTION

Tooth decay is the result of caries-causing bacteria corroding a tooth for an extended period of time. Symptoms of tooth decay include pain, eating difficulties and swollen gums. For shallow caries, dentists usually remove carious lesion and seal the tooth with filling materials. However, if bacteria have invaded the pulp tissue, root canal treatment would be needed. In the event of a root canal treatment failure, an apicoectomy that removes a root tip of the tooth can be selectively performed based on the patient's conditions. In general, information of an affected area, a tooth root and an alveolar bone of the patient is obtained through a radiation scan to confirm approaches of the procedure before the apicoectomy. During the procedure, the gingival flap is reflexed, a part of the alveolar bone is drilled and removed to reveal the root tip of the patient, the root tip is resected, associated surrounding tissues are cleaned, and the flap is repositioned and secured with sutures. However, performing the apicoectomy procedure in the posterior tooth area is quite difficult because of a small operation space and poor viewing angles, and the range of the bone plate drilled and removed needs to be minimized to ensure that the patient can quickly recover from the procedure. Thus, the implementation of apicoectomy is quite challenging.

In Journal of Endodontics (JOE), Vol. 33, No. 2, page 148 to 151, 2007, an article "Periapical Surgery Using CAD/CAM Guidance: Preclinical Results" (by Champleboux, Pinsky and Sarment), discloses preclinical results of an apicoectomy guide plate manufactured by a computer-aided design (CAD)/computer aided manufacturing (CAM) system. In the method, a dental model is first obtained through impression, and a corresponding scan guide plate is manufactured. The dental model and the scan guide plate are combined, three-dimensional CBCT and scanned with osteotomy and apical apicoectomy are planned according to the obtained cone-beam computed tomography (CBCT) image, and an apicoectomy guide plate is then manufactured. According to the test results in the above publication, using apicoectomy guide plate got a shorter average bone drilling distance, compared to when the above guide plate is not used. In other words, when the surgical guide plate is used, a performer of the procedure can correctly drill to the affected area through a fewer number of attempts. Therefore, is assured that apicoectomy guide plate provides benefits for performing such procedure.

However, the above publication did not consider an issue that an affected area at an edge or a corner of a root cannot be completely removed easily, and a conventional surgical guide plate provides a guiding effect for drilling towards the root of the tooth, but lacks the same guiding effect for drilling in mesial and distal direction. Further, a conventional guide plate does not provide a technical solution for steady binding between a soft tissue and the surgical guide plate. Therefore, the prior art proposes only a preliminary concept of using a surgical guide plate, but has not yet achieved a phase that can be actually applied to clinical medicine.

SUMMARY OF THE INVENTION

The object of the present invention is to design to solve the issues of the prior art which lacks a technical solution for designing an apicoectomy guide plate, and the apicoectomy guide plate is incapable of binding with the tooth jaw of a patient and moving to assist in continuous drilling.

To achieve the above object, the present invention provides a method for manufacturing an apicoectomy guide plate including steps of: a) scanning oral cavity characteristics of a patient to obtain a tooth jaw image model, a soft tissue image model, an alveolar bone image model, a tooth crown image model and a tooth root image model, the tooth root image model defined with at least one affected area; b) calculating position relations of the tooth jaw image model corresponding to the soft tissue image model and the alveolar bone image model to determine at least one osteotomy and apicoectomy procedure, which communicates an outer periphery of the tooth jaw image model to the affected area, and establishing a guide plate model corresponding to the tooth jaw image model and the osteotomy and apicoectomy procedure; and c) outputting an apicoectomy guide plate constructed according to the guide plate model, the apicoectomy guide plate including a connecting portion corresponding to the soft tissue image model and the tooth crown model, and a positioning portion corresponding to the affected area and comprising at least one pre-drilled hole corresponding to the osteotomy and apicoectomy procedure.

Further, the positioning portion includes a support body corresponding to a partial contour of a side edge of the tooth jaw of the patient, and the pre-drilled hole established on the support body.

Further, step (b) further includes steps of: b1) calculating a depth of the osteotomy and apicoectomy procedure communicating to the pre-drilled hole to determine at least one first stop edge at an inner edge of the pre-drilled hole, and a guiding track jointly defined by the first stop edge and the pre-drilled hole and for guiding a hand tool of a dentist.

Further, the tooth root image model includes distribution information of nerve and vascular anatomy structures of the patient, and the osteotomy and apicoectomy procedure does not pass through the above anatomy structures when the osteotomy and apicoectomy procedure is determined in step (b).

Further, step (a) comprises steps of: a1) manufacturing a impression mold corresponding to the oral cavity characteristics of the patient; and a2) scanning the impression mold to obtain the tooth jaw image model.

Further, step (b) further includes steps of: b2) calculating depth information of the osteotomy and apicoectomy procedure, and providing a depth label at a periphery of the pre-drilled hole according to the depth information.

Another object of the present invention is to provide a manufacturing system for fabricating an apicoectomy guide plate. The system includes a scanning device, a display unit, a control unit and an output unit. The scanning device scans the oral cavity characteristics of a patient, and obtains a tooth jaw image model, a soft tissue image model, an alveolar bone image model, a tooth crown image model and a tooth root image model. The display unit, connected to the scanning device, displays a scan result of the scanning device. The control unit, informationally connected to the display unit and the scanning device, includes a labeling module for a user to define at least one affected area from the tooth root image model, a calculating module for calculating a position relation of the affected area corresponding to the tooth jaw image model, a route planning module for the user to define at least one osteotomy and apicoectomy procedure, and a guide plate forming module for generating a guide plate model corresponding to the tooth jaw image model and the osteotomy and apicoectomy procedure. The output unit, informationally connected to the control unit, outputs an apicoectomy guide plate constructed according to the guide plate model. The apicoectomy guide plate includes a connecting portion corresponding to the soft tissue image model and the tooth crown image model, and a positioning portion corresponding to the affected area and comprising at least one pre-drilled hole corresponding to the osteotomy and apicoectomy procedure.

Further, the system for manufacturing an apicoectomy guide plate further includes a mirror unit. The mirror unit includes a barrel, and at least one reflecting surface obliquely disposed at one end of the barrel.

Further, the system for manufacturing an apicoectomy guide plate further includes a dental bur. The dental bur includes a drilling portion comprising a length configured according to the tooth root image model, a locking portion connected to the drilling portion and locked on a dental bur seat, and a sleeve ring sleeved on the drilling portion and comprising a flange at an outer periphery thereof.

One of the objects of the present invention is to provide a computer-readable recording medium executable on an electronic device. The computer-readable recording medium is recorded with a method for manufacturing an apicoectomy guide plate, and the method includes the abovementioned method and steps.

In conclusion, compared to the prior art, the present invention provides following technical effects. In the present invention, an oral structure of a patient is scanned to reduce an error caused by planning a surgical guide plate through two-dimensional computed image forming of the prior art. Further, in the apicoectomy guide plate of the present invention, the apicoectomy guide plate is provided with a connecting portion corresponding to a side edge of the jaw, thus can be securely positioned in an oral cavity to prevent error resulted from mutual disengagement of the two or inappropriate alignment. Further, using the guide track provided, the apicoectomy guide plate of the present invention is capable of guiding a dentist to perform lateral and vertical movements for continuous drilling; ensuring that an affected area of the tooth root is completed resected.

DETAILED DESCRIPTION OF THE PREFERRED EMBODIMENTS

Figure 1:
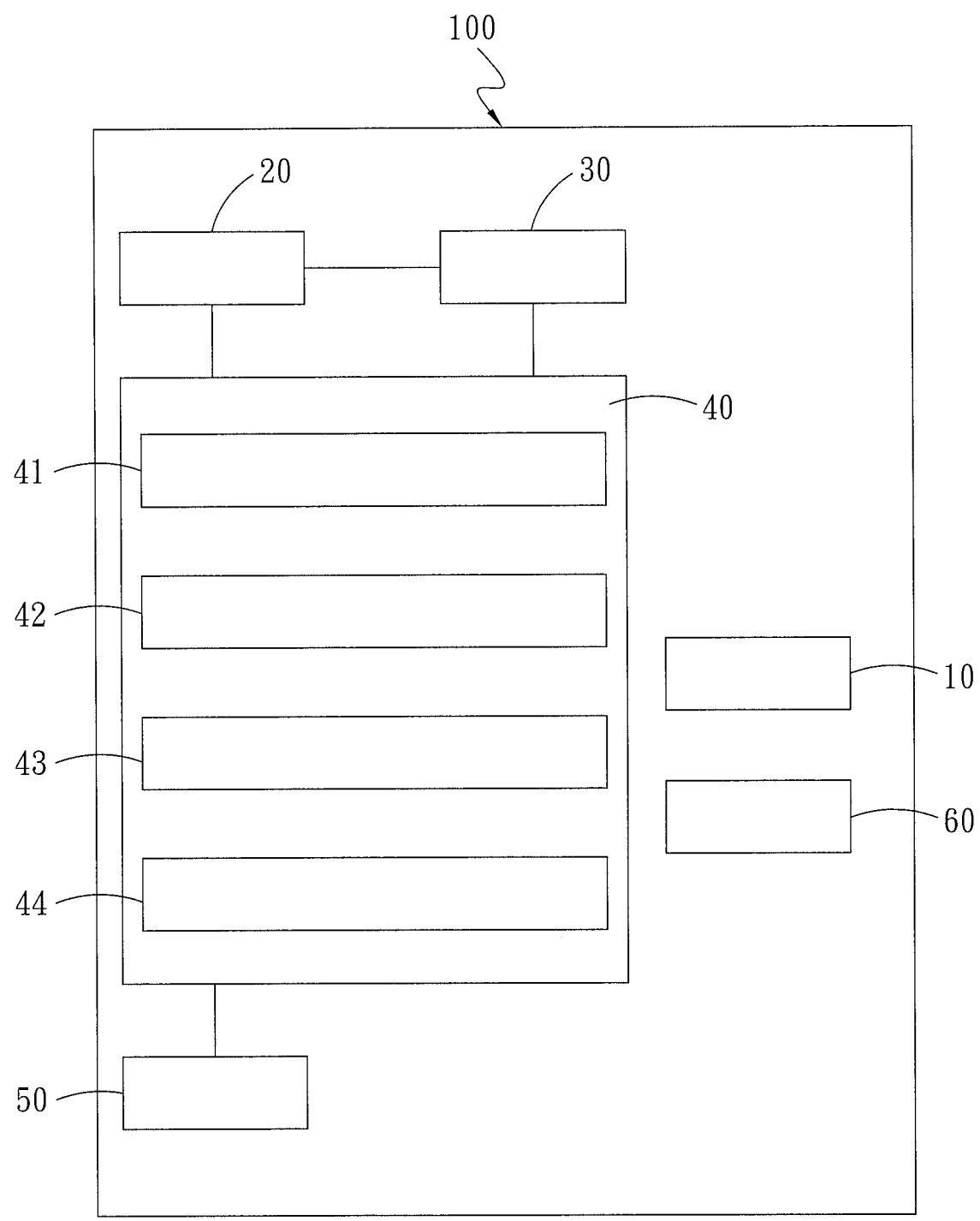
FIG. 1 is a block diagram of a system for manufacturing an apicoectomy guide plate of the present invention.

With respect the technology of the present invention, referring to FIG. 1, the present invention provides a method and system for manufacturing an apicoectomy guide plate 900. The method and system are suitable for, estimating oral cavity and jaw conditions of a patient before a dentist performs an apicoectomy procedure, and customizing the apicoectomy guide plate 900 suitable for the patient to assist the procedure to be smoothly performed.

More specifically, an apicoectomy guide plate manufacturing system 100 includes a scanning device 20, a display unit 30, a control unit 40 and an output unit 50. The scanning device 20 scans oral cavity characteristics of the patient, and obtains a tooth jaw image model, a soft tissue image model corresponding to soft tissues such as mucosa and gums in the oral cavity of the patient, an alveolar bone image model obtained through radiation exposure, a tooth crown image model, and a tooth root image model. In this embodiment, the dentist may pre-make a impression mold 10, which corresponds to the oral cavity characteristics of the patient, e.g., contours of the jaw, gum and teeth, to further duplicate the oral cavity characteristics of the patient. Further, the impression mold 10 is scanned to prevent image scanning from interference of human parts such as the face.

The display unit 30 displays a scan result of the scanning device 20, and the foregoing image models. The control unit 40 includes a labeling module 41 for a user to define at least one affected area from the tooth root image model, a calculating module 42 for calculating a position relation of the affected area corresponding to the tooth jaw image model, a route planning module 43 for the user to define at least one bone drilling path of an osteotomy and apicoectomy procedure, and a guide plate forming module 44 for generating a guide plate model corresponding to the tooth jaw image model and the bone drilling path.

Figure 2:
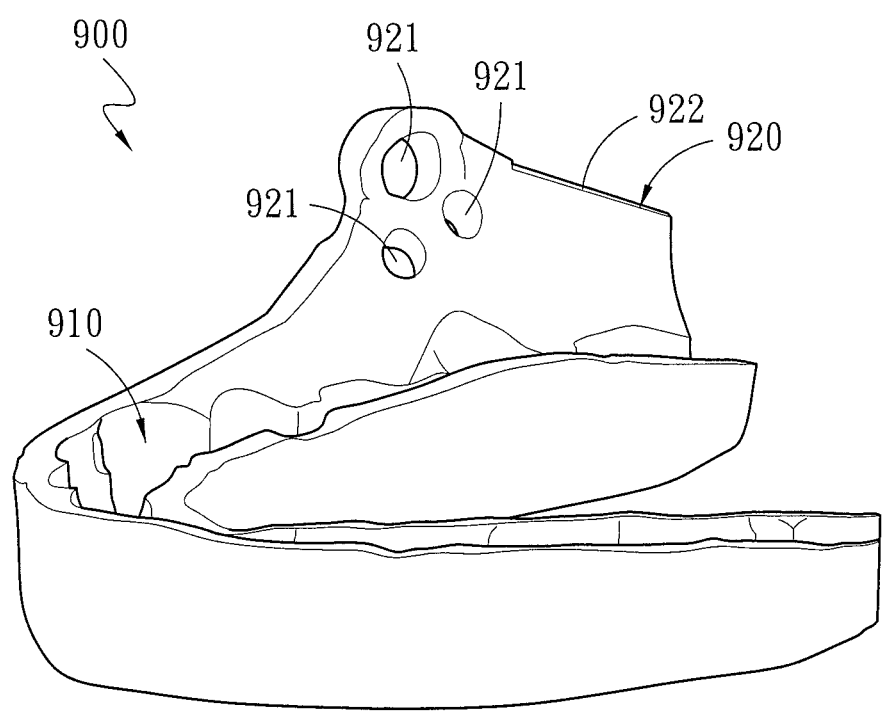
FIG. 2 is a perspective view of a surgical guide plate according to an embodiment of the present invention.

Referring to FIG. 2, the output unit 50 outputs the apicoectomy guide plate 900 constructed according to the guide plate model. For example, the output unit 50 may be a 3D printer. The apicoectomy guide plate 900 includes a connecting portion 910 corresponding to the soft tissue image model and the tooth crown image model, and a positioning portion 920 corresponding to the affected area. The connecting portion 910 may be sleeved around the gum and tooth crown of the patient and correspond to a dental arch curve of the patient, such that the apicoectomy guide plate 900 can be securely and closely fitted with the contour of the tooth jaw of the patient. The positioning portion 920 includes at least one pre-drilled hole 921 corresponding to the bone drilling path. The pre-drilled hole 921 is for the dentist to determine a position of drilling With the above structure, the dentist can manufacture the apicoectomy guide plate 900 suitable for the patient by using the apicoectomy guide plate manufacturing system 100.

Figure 3:
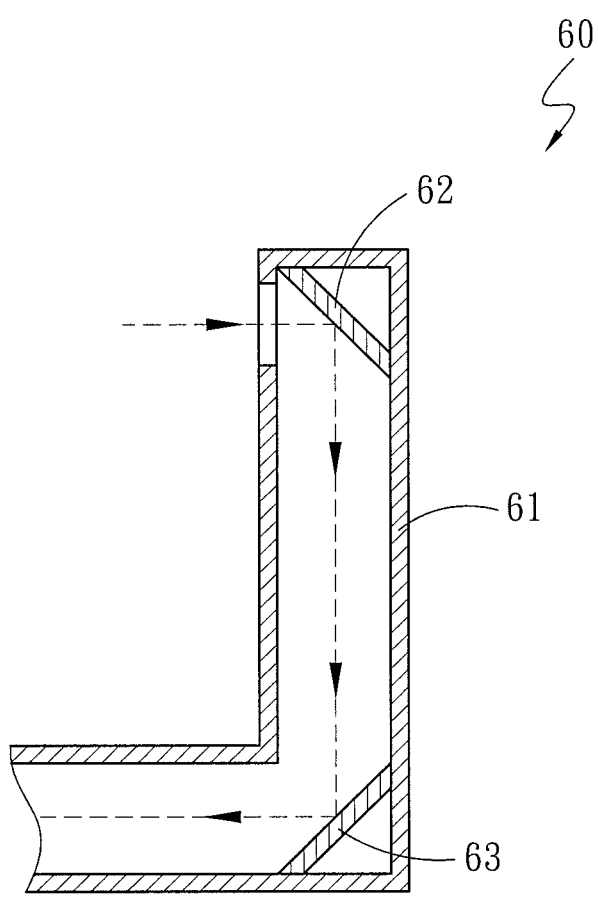
FIG. 3 is a sectional view of a mirror unit of the present invention.

Referring to the FIG. 3, the apicoectomy guide plate manufacturing system 100 further includes a mirror unit 60. The mirror unit 60 includes a barrel 61, and at least one reflecting surface 62 obliquely disposed at one end of the barrel 61. In this embodiment, the reflecting surface 62 may be a coated film or a mirror. When the barrel 61 is in a bent form, a secondary reflecting surface 63 facing the reflecting surface 62 may be additionally provided to reflect light again. When the dentist needs to observe conditions of a posterior tooth area, the mirror unit 60 allows the dentist to place the barrel 61 from the vestibule of the oral cavity and deeper towards the oral cavity of the patient, and to directly view associated images through the reflected light of the reflecting surface 62, so as to determine the type of treatment to be performed according to the progress of the apicoectomy.

A method for manufacturing the apicoectomy guide plate 900 of the present invention is given in detail below. In step (a), an oral cavity of a patient is scanned to obtain the tooth jaw image model, the soft tissue image model, the alveolar bone image model, the tooth crown model, and the tooth root image model. After the scanning, the dentist can identify the tooth root with lesion from the tooth root image model, and label the root tip with lesion as an affected area. In step (a), the dentist may directly scan the jaw of the patient by using a 3D oral cavity scanner. Alternatively, in this embodiment, before step (a), steps (a1) and (a2) are performed. In step (a1), a impression mold 10 corresponding to oral cavity characteristics of the patient is manufactured. In step (a2), the impression mold 10 is scanned to obtain the tooth jaw image model. In this embodiment, the tooth root image model further includes distribution information of nerve and vascular anatomy structures of the patient, so as to avoid these anatomy structures when a bone drilling path is subsequently planned. Further, if the procedure needs to pass through the sinus, a sinus lift procedure is performed, in which the sinus membrane is padded and lifted by injecting physiological saline or through other ways to avoid these anatomy structures.

In step (b), position relations of the tooth jaw image model corresponding to the soft tissue image model and the alveolar bone image model are calculated to determine the bone drilling path of the osteotomy and apicoectomy procedure, which communicates from an outer peripheral surface of the tooth jaw image model to the affected area, and a guide plate model corresponding to the tooth jaw image model and the osteotomy and the apicoectomy procedure is established to compete a 3D computed image of the apicoectomy guide plate 900. In this step, the tooth jaw image model obtained by 3D scanning (directly performed on the oral cavity of the patient, or indirectly performed through the impression mold 10) is overlapped and compared with the soft tissue image model and the alveolar bone image model having undergone computed tomography, and the soft tissue image model and the alveolar bone image model are corrected according to the tooth jaw image model. Because tomography is an integration of consecutive 2D images, any minute posture changes of the patient during the scanning process may cause differences among the 2D images. Thus, in the present invention, correction is performed through the tooth jaw image model having a higher reliability, thereby increasing the alignment precision of the apicoectomy guide plate 900 subsequently manufactured.

Figure 4:
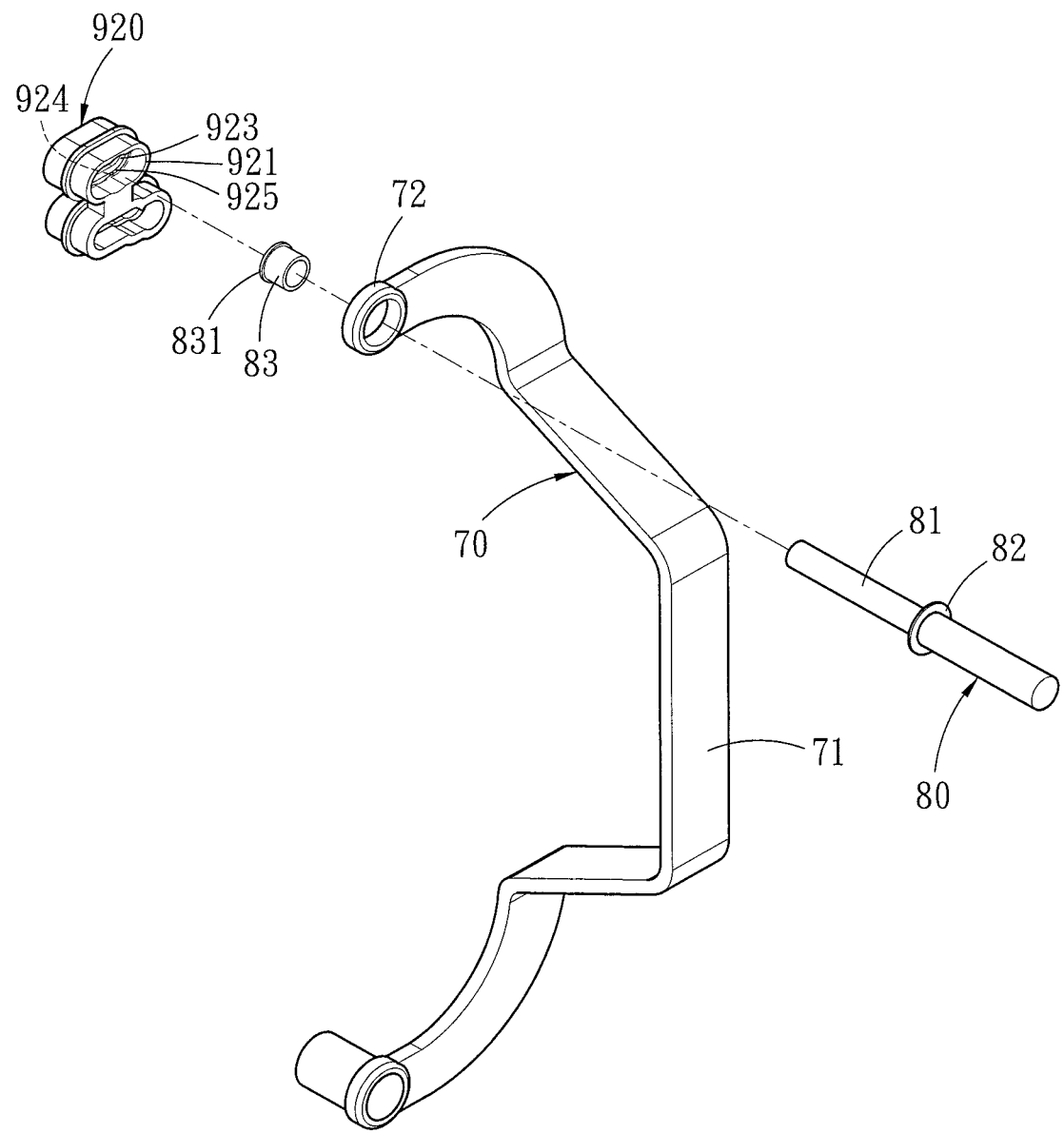
FIG. 4 is an exploded view of a positioning portion in use of the present invention.
Figure 5:
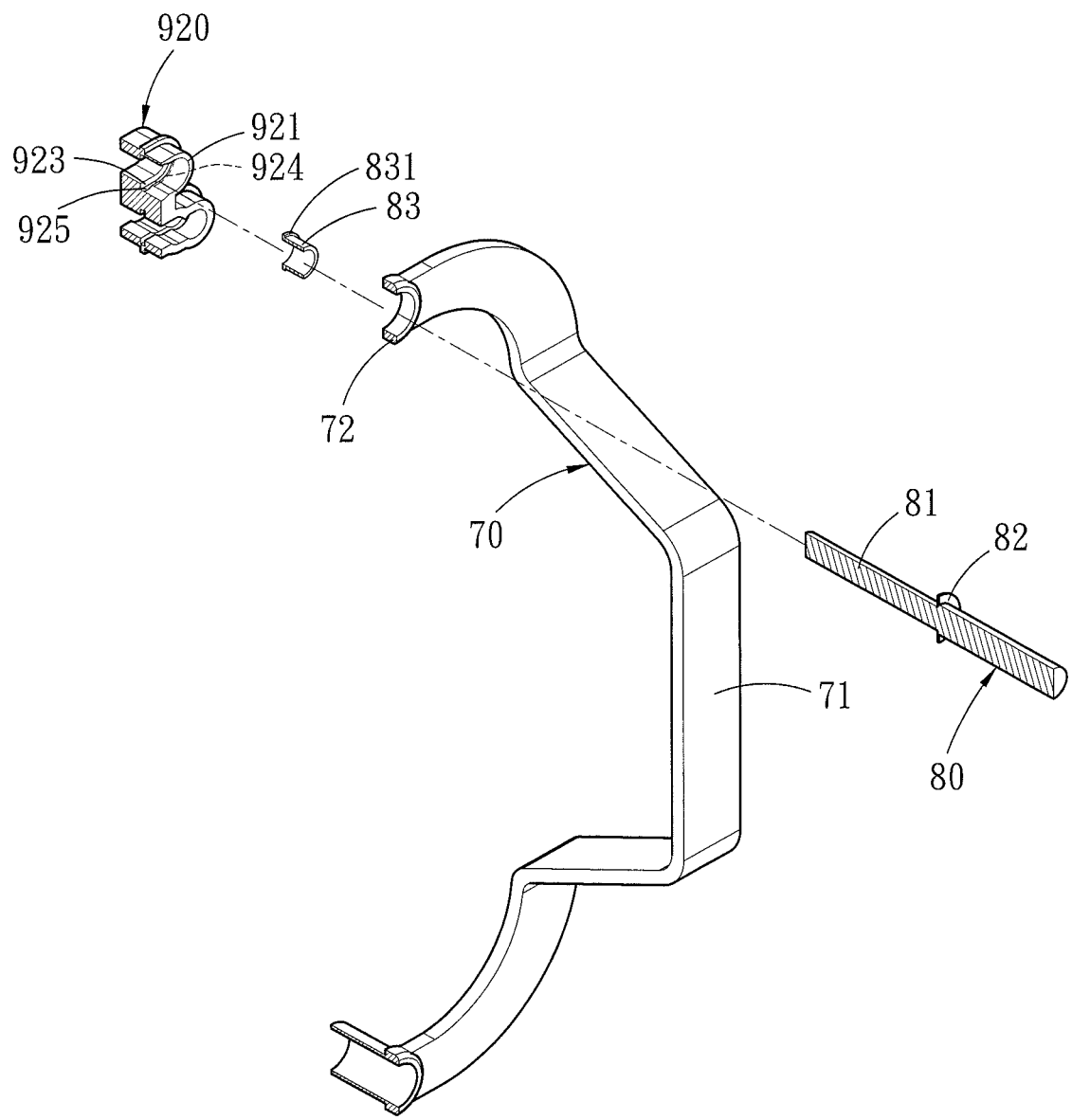
FIG. 5 is a partial sectional view of FIG. 4.
Figure 6:
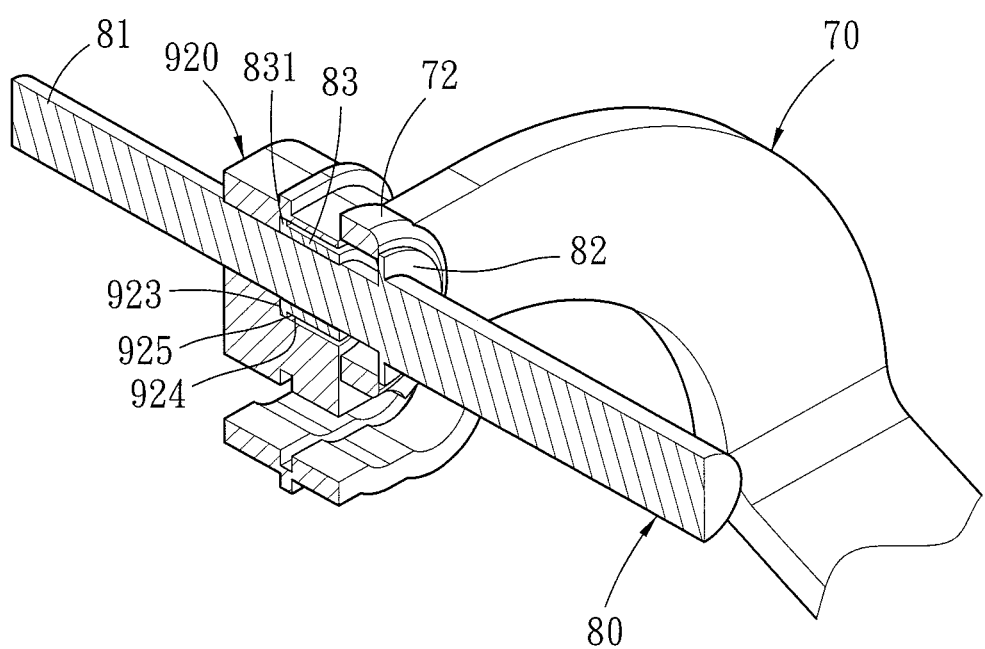
FIG. 6 is a partial sectional view of a positioning portion in use of the present invention.
Figure 7:
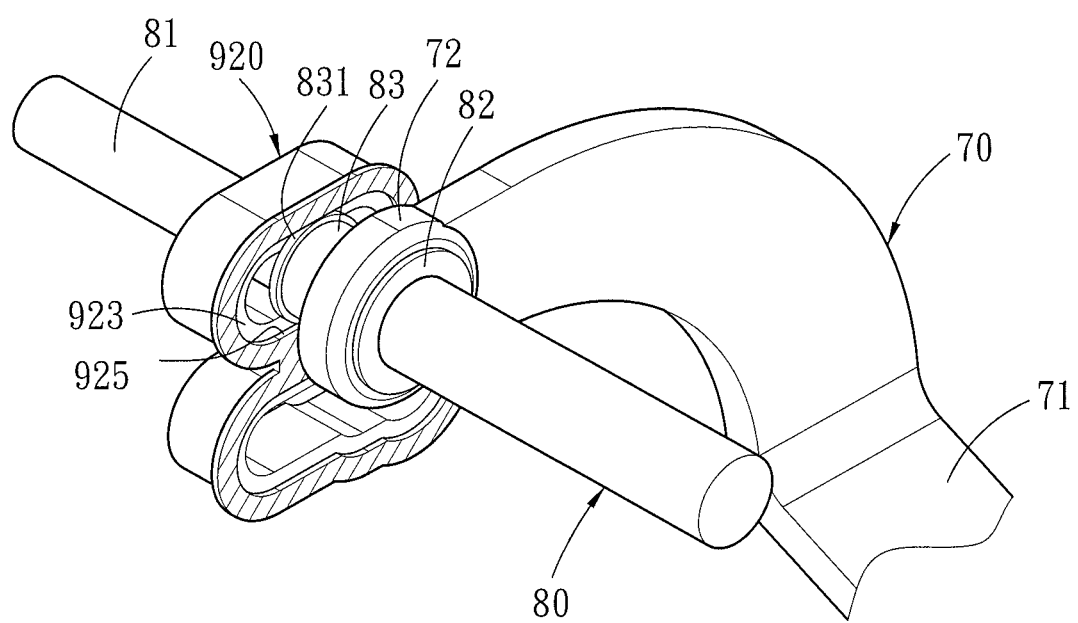
FIG. 7 and FIG. 8 are partial sectional views of a positioning portion in another use of the present invention.
Figure 8:
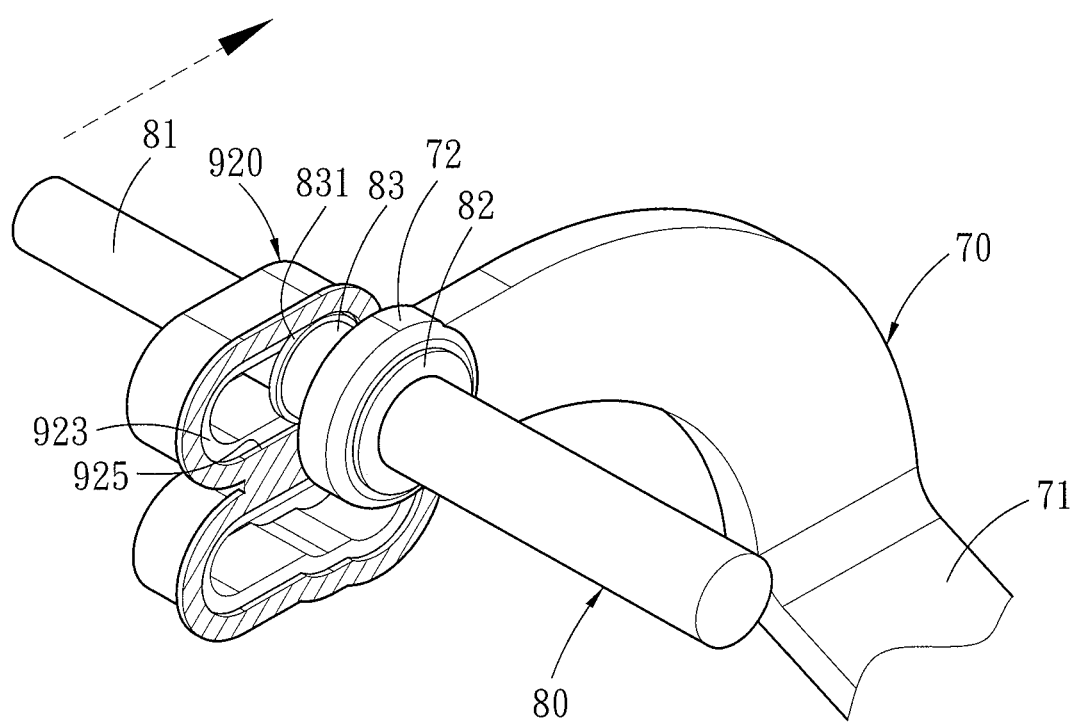

Referring to FIG. 4, step (b) preferably includes step (b1). In step (b1), a depth of the bone drilling path communicating to the pre-drilled hole 921 is calculated, so as to determine at least one first stop edge 923 provided at an inner edge of the pre-drilled hole 921 and a guiding track 925. The guiding track 925 is jointly defined by the first stop edge 923 and the pre-drilled hole 921, and is for guiding a hand tool of the dentist. As shown in FIG. 5, FIG. 6, FIG. 7 and FIG. 8, the dentist may use a handle 70 together with a dental bur 80. The handle 70 comprises a grip portion 71 for the dentist to hold onto, and a dental bur seat 72 perpendicular to the direction of the grip portion 71 held by the dentist. The dental bur 80 is disposed on the dental bur seat 72, and includes a drilling portion 81 with a length configured according to the tooth root image model, a locking portion 82 connected to the drilling portion 81 and locked on the dental bur seat 72, and a sleeve ring 83 sleeved on the drilling portion 81. The sleeve ring 83 comprises a flange 831 at an outer periphery thereof. The drilling portion 81 and the sleeve ring 83 can be penetrated into the pre-drilled hole 921, and then the flange 831 is stopped at the first stop edge 923. In this embodiment, a second stop edge 924 spaced from the first stop edge 923 may be additionally provided, such that the flange 831 is located in the guiding track 925 between the first stop edge 923 and the second stop edge 924, and the dentist is allowed to move the handle 70 along the guiding track 925 (which may be disposed in a direction that is not limited by the present invention, e.g., a horizontal, vertical or slanting direction) to achieve the object of completing continuous drilling in any desired direction and removing an affected tooth root with the assistance of the surgical guide plate. Further, as a tooth root with lesion is enclosed by the gum and alveolar bone, a dentist performing a conventional procedure can only determine a drilling depth based on personal experience. In the present invention, step (b) may include step (b2). In step (b2), depth information of the bone drilling path is calculated, and a depth label is provided at a periphery of the pre-drilled hole 921 according to the depth information. Apart from the depth, the depth information can also include information such as resection range and width. In the present invention, the depth label may be numbers and symbols directly provided on the surgical guide plate. Alternatively, the depth label may be provided on a metal color ring (not shown) accommodated around an inner edge of the pre-drilled hole 921, so as to allow the dentist to identify the drill length to be adopted for each pre-drilled hole 921, thus minimizing the probability of drilling errors.

In step (c), the apicoectomy guide plate 900 constructed according to the guide plate model is outputted. The apicoectomy guide plate 900 includes a connecting portion 910 corresponding to the soft tissue image model and the tooth crown image model, and a positioning portion 920 corresponding to the affected area. The positioning portion 920 includes at least one pre-drilled hole 921 corresponding to the bone drilling path. In the method of the present invention, the positioning portion 920 is designed to include a support body 922 corresponding to a partial contour of the side edge of the tooth jaw of the patient, and the pre-drilled hole 921 is provided on the support body 922. As such, the support body 922 can be clamped by the jaw and be naturally secured, so as to prevent differences caused by moving of the apicoectomy guide plate 900.

Further, the method of the present invention may be recorded in a computer-readable recording medium, e.g., an optical disc, a portable drive and a mobile drive. The above method for manufacturing the apicoectomy guide plate 900 can be performed on a computer or a dedicated apparatus.

What is claimed is:

1. A method for manufacturing an apicoectomy guide plate, comprising steps of:
   (a) obtaining a tooth jaw image model, a soft tissue image model, an alveolar bone image model, a tooth crown image model and a tooth root image model of a patient by a scanning device, and defining at least one affected area from the tooth root image model;
   (b) defining at least one bone drilling path of an osteotomy and apicoectomy procedure based on related positions of the affected area corresponding to the tooth jaw image model, the soft tissue image model, and the alveolar bone image model, wherein the bone drilling path is a route from an outer peripheral surface of the tooth jaw image model to the affected area, wherein said step (b) further comprises:

(b1) calculating a depth of the bone drilling path which corresponds to at least one pre-drilled hole to determine at least one first stop edge provided at an inner edge of the pre-drilled hole, and defining a guiding track jointly by the first stop edge and the pre-drilled hole and for guiding a hand tool of a dentist; and (c) establishing a guide plate model based on the tooth jaw image model, the soft tissue image model, the tooth crown image model, and the bone drilling path, and outputting an apicoectomy guide plate which is constructed according to the guide plate model, wherein the apicoectomy guide plate comprises a connecting portion corresponding to the soft tissue image model and the tooth crown image model, and a positioning portion corresponding to the affected area and comprising the pre-drilled hole.

2. The method for manufacturing an apicoectomy guide plate of claim 1, wherein the positioning portion comprises a support body corresponding to a partial contour of a side edge of a tooth jaw of the patient, and the pre-drilled hole is provided on the support body.

3. The method for manufacturing an apicoectomy guide plate of claim 1, wherein the tooth root image model comprises distribution information of nerve and vascular anatomy structures of the patient, and the bone drilling path does not pass through the anatomy structures when the bone drilling path is defined in step (b).

4. The method for manufacturing an apicoectomy guide plate of claim 1, wherein step (a) comprises:
(a1) manufacturing a impression mold corresponding to an oral cavity characteristics of the patient; and
(a2) scanning the impression mold to obtain the tooth jaw image model.

5. The method for manufacturing an apicoectomy guide plate of claim 1, wherein step (b) further comprises:
(b2) calculating depth information of the osteotomy and apicoectomy procedure, and providing a depth label at a periphery of the pre-drilled hole according to the depth information.

6. An apicoectomy guide plate manufacturing system, comprising:
a scanning device, scanning oral cavity characteristics of a patient to obtain a scan result, wherein the scanning result comprises a tooth jaw image model, a soft tissue image model, an alveolar bone image model, a tooth crown image model and a tooth root image model;
a display unit, informationally connected to the scanning device, and displaying the scan result of the scanning device;
a control unit, informationally connected to the display unit and the scanning device, comprising a labeling module defining at least one affected area from the tooth root image model, a calculating module calculating relation positions of the affected area corresponding to the tooth jaw image model, a soft tissue image model, and an alveolar bone image model, a route planning module defining at least one bone drilling path of an osteotomy and apicoectomy procedure based on the related positions of the affected area corresponding to the tooth jaw image model, the soft tissue image model, and the alveolar bone image model, and a guide plate forming module establishing a guide plate model based on the tooth jaw image model, the soft tissue image model, the tooth crown image model, and the bone drilling path; and
an output unit, informationally connected to the control unit, and outputting an apicoectomy guide plate constructed according to the guide plate model,
wherein the apicoectomy guide plate comprises a connecting portion corresponding to the soft tissue image model and the tooth crown image model, and a positioning portion corresponds to the affected area and comprises at least one pre-drilled hole, and
wherein a guiding track is defined by the pre-drilled hole and at least one first stop edge provided at an inner edge of the pre-drilled hole.

7. The apicoectomy guide plate manufacturing system of claim 6, further comprising:
a mirror unit, comprising a barrel, and a reflecting surface disposed at one end of the barrel.

8. The apicoectomy guide plate manufacturing system of claim 6, further comprising: a dental bur comprising a drilling portion with a length configured according to the tooth root image model, a locking portion connected to the drilling portion and locked on a dental bur seat, and a sleeve ring sleeved on the drilling portion and comprising a flange.

9. A non-transitory computer-readable recording medium, executable on an electronic device, recording a method for manufacturing an apicoectomy guide plate, the method comprising steps of claim 1.

* * * * *